UNITED STATES PATENT OFFICE.

EMILIO FERNANDO BOLT, OF COPENHAGEN, DENMARK.

PROCESS OF OBTAINING MEDICINE FROM CARROTS.

No. 857,224.　　　Specification of Letters Patent.　　　Patented June 18, 1907.

Application filed December 27, 1904. Serial No. 238,500.

*To all whom it may concern:*

Be it known that I, EMILIO FERNANDO BOLT, a citizen of Denmark, and residing at Copenhagen, Gammel Kongevej 168, have invented a certain new and useful Improvement in Processes for Producing of a Medicine from Carrots, of which the following is a specification.

My invention relates to the manufacture of medicines from carrot juice.

It has long been known that the juice of carrots prepared in various ways, possesses great curative properties for diseases such as bronchitis or ailments such as whooping cough. Heretofore in all known processes, for the production of medicines of this nature, there has been added to the juice a suitable quantity of sugar, the mixture being subsequently boiled to obtain the desired consistency. The great defect in this process is that, a short time after the boiling and bottling, spontaneous and uncontrolled bacteriological fermentation sets in, which soon renders the medicine turbid and unfit for medicinal purposes. Heretofore the fermentation has not been arrested and no means have been utilized for its prevention.

My invention consists in subjecting carrot juice, or other liquid, to the short action of a ferment thereby substantially destroying bacterial growth and in subsequently separating the ferment from the juice or liquid before absolute alcohol-fermentation is reached, and when the ingredients of the juice which detract from its durability and taste have been secreted, the solution being finally sterilized to destroy any remaining germs, thereby rendering the liquid immune to subsequent bacterial inoculation.

My invention consists in the process and the product resulting therefrom.

The preferred steps by means of which the product is secured are as follows: The juice is extracted from the carrots, by means of a filter press or in any desirable and economical manner, and delivered therefrom to a suitable receptacle. A yeast is next added, in sufficient quantities, and allowed to react until it has checked the development of bacteria, then, to prevent its further action, which would bring about a material loss of the extract, and as a consequence an increase in the amount of alcohol, the solution is then filtered or subjected to a centrifugal separator. This step in the process leaves the solution free from particles of yeast or other solid matter. In order to prevent the remaining bacteria, or germs which may find access to the liquid, from causing subsequent fermentation the solution is sterilized leaving a perfectly hygienic product. I have found by experiment that a sort of wine-yeast, for instance a choice brand of genuine Rhenish wine-yeast, serves the purpose of a ferment in a highly satisfactory manner, inasmuch as it not only performs the function of a ferment but also imparts to the juice the palatable flavor and pleasing aroma of wine. Also the small quantity of alcohol developed during the short and suppressed fermentation gives the liquid a quite peculiar character and adds to its healing qualities.

Among the many advantages accruing from my improved process is, first, that I avoid the boiling operation heretofore used, thereby effecting a very material saving in fuel; second, the apparatus whereby the process is carried out is relatively simplified; third, in processes heretofore known for the production of a medicine of this nature no steps have been taken to arrest fermentation therefore bacteria has formed in the bottled goods resulting in putrefaction and consequent waste. This very great defect is entirely avoided in my improved process by the introduction of a ferment and the destruction of the bacteria before the medicine is bottled.

Having now described my invention, what I claim as new and desire to secure by Letters Patent is:—

The hereindescribed process of producing a medicine from carrots, which consists in extracting the juice from the carrots, adding to said juice a quantity of wine yeast sufficient to produce active fermentation therein, maintaining the materials at a temperature at which fermentation can take place until a small portion of the fermentable material contained in the juice is transformed into alcohol, then removing the yeast and sterilizing the resulting liquid.

In witness whereof I have hereunto set my hand in presence of two witnesses.

EMILIO FERNANDO BOLT.

Witnesses:
　HANS PEDERSEN,
　CARL ANDERSEN.